United States Patent [19]

Hershey et al.

[11] Patent Number: 5,497,397
[45] Date of Patent: Mar. 5, 1996

[54] PARALLEL DATAWORD MODULATION SCHEME

[75] Inventors: John E. Hershey, Ballston Lake; Gary J. Saulnier, Rexford, both of N.Y.

[73] Assignee: General Electric Company, Schenectady, N.Y.

[21] Appl. No.: 267,346

[22] Filed: Jun. 29, 1994

[51] Int. Cl.$^6$ ........................................ H04L 27/00
[52] U.S. Cl. ................................. 375/259; 375/279
[58] Field of Search ................................ 375/259, 260, 375/261, 239, 363, 364, 365, 368, 279, 308, 329; 455/59, 60, 61; 370/112, 12, 18, 57, 121, 122

[56] References Cited

U.S. PATENT DOCUMENTS 5,351,272   9/1994   Abraham .................................. 375/260

*Primary Examiner*—Stephen Chin
*Assistant Examiner*—Hai H. Phan
*Attorney, Agent, or Firm*—Lawrence P. Zale; Marvin Snyder

[57] ABSTRACT

Data words are transmitted over a radio channel with a novel modulation scheme which transmits data in parallel. An entire data word is modulated by separating a carrier frequency band into a number of discrete 'tones'. Tone $T_1$ is set to a zero phase shift in order to provide timing in synchronization of the signal. The remaining tones are phase shifted according to a predetermined convention, thereby encoding the bits of the data word. The phase shifts for all tones comprises a spectrum which is transmitted to a receiver simultaneously. A receiver monitors tone $T_1$ for zero phase shifts to provide synchronization of the signal. The remaining tones are analyzed for their phase shift to provide bits which are assembled into a transmitted data word. Since the bits are transmitted in parallel as the data word, as opposed to conventional modulation schemes, the throughput is increased.

2 Claims, 2 Drawing Sheets

PARALLEL DATAWORD MODULATION SCHEME

CROSS REFERENCE TO RELATED APPLICATIONS

This invention is related to U.S. patent applications Ser. No. 08/267,347, filed Jun. 29, 1994, "New Mobile Telecommunications Device and Service" by Amer Hassan, John Hershey, Howard Lester, Charles Puckette; Ser. No. 08/267,328, filed Jun. 29, 1994, "Datagram Communication Service over a Cellular Telephone Network" by John Hershey, Amer Hassan; Ser. No. 08/267,348 filed Jun. 29, 1994, "Datagram Message Communication Service Employing a Hybrid Network" by John Hershey; all assigned to the present assignee.

BACKGROUND OF THE INVENTION

1. Scope of the Invention

The present invention relates to digital radio modulation and more particularly, modulation of a data word in parallel.

2. Description of Related Art

Data or digitized analog information, is typically transmitted via radiowaves from a transmitter to a receiver. There are many ways of modulating the data to encode the digital information. One such way is to map data bits to phase shifts of a carrier wave. Therefore, a carrier wave has phase shifts which are modulated according to the input data transmitted and received at a receiver which then identifies the phase shift and the carrier signal to recover the encoded data.

Two such types of modulation are quadrature phase shift keyed (QPSK) modulation, and differential quadrature phase shift keyed (DQPSK) modulation.

There are also frequency modulation schemes in which data is encoded as the frequency of the carrier such as frequency shift keying (FSK) and continuous FSK (CPFSK).

There are also amplitude modulation schemes such as two or four level amplitude modulation (AM), and quadrature amplitude modulation (QAM).

In each of the above modulation schemes, a change in the frequency, phase, or amplitude modulates a single-bit, or several bits, of information being transmitted sequentially.

OBJECTS OF THE INVENTION

It is an object of the present invention to transmit several data bits in parallel and provide an improved data communication system.

It is another object of the present invention to provide a radio transmission system which provides greater throughput than conventional modulation schemes.

SUMMARY Of THE INVENTION

Digital information, in the form of data words are transmitted in parallel over a radio channel.

A carrier signal spectrum is synthesized and divided into a number of carrier tones with one carrier tone being used for synchronization and the phase of each of the other carrier tones each representing a bit value of the data word.

The carrier tones are phase shifted by a predetermined phase shift if the corresponding bit has a value of '1', and not shifted or shifted by a second predetermined phase shift, if the value of the corresponding bit is '0' to result in data word tones.

The data word tones and the synchronization tone are synthesized by using an inverse transform to produce a time-varying radio signal and transmitting the radio signal to a receiver.

At the receiver, the radio signal is transformed into the frequency domain. The synchronization tone is monitored by the receiver to determine synchronization and separate the radio signal into data word intervals each pertaining to a data word. The spectrum of the radio signal for each data word interval is transforming into the frequency domain and sectioned into signals representing each data bit.

The effect of the receiver processing is that each tone is compared to a synthesized carrier tone to determine the phase shift and decode a bit value. The bit values are assembled into a data word. Since many bit values are encoded by phase shifts, many bits may be transmitted simultaneously.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
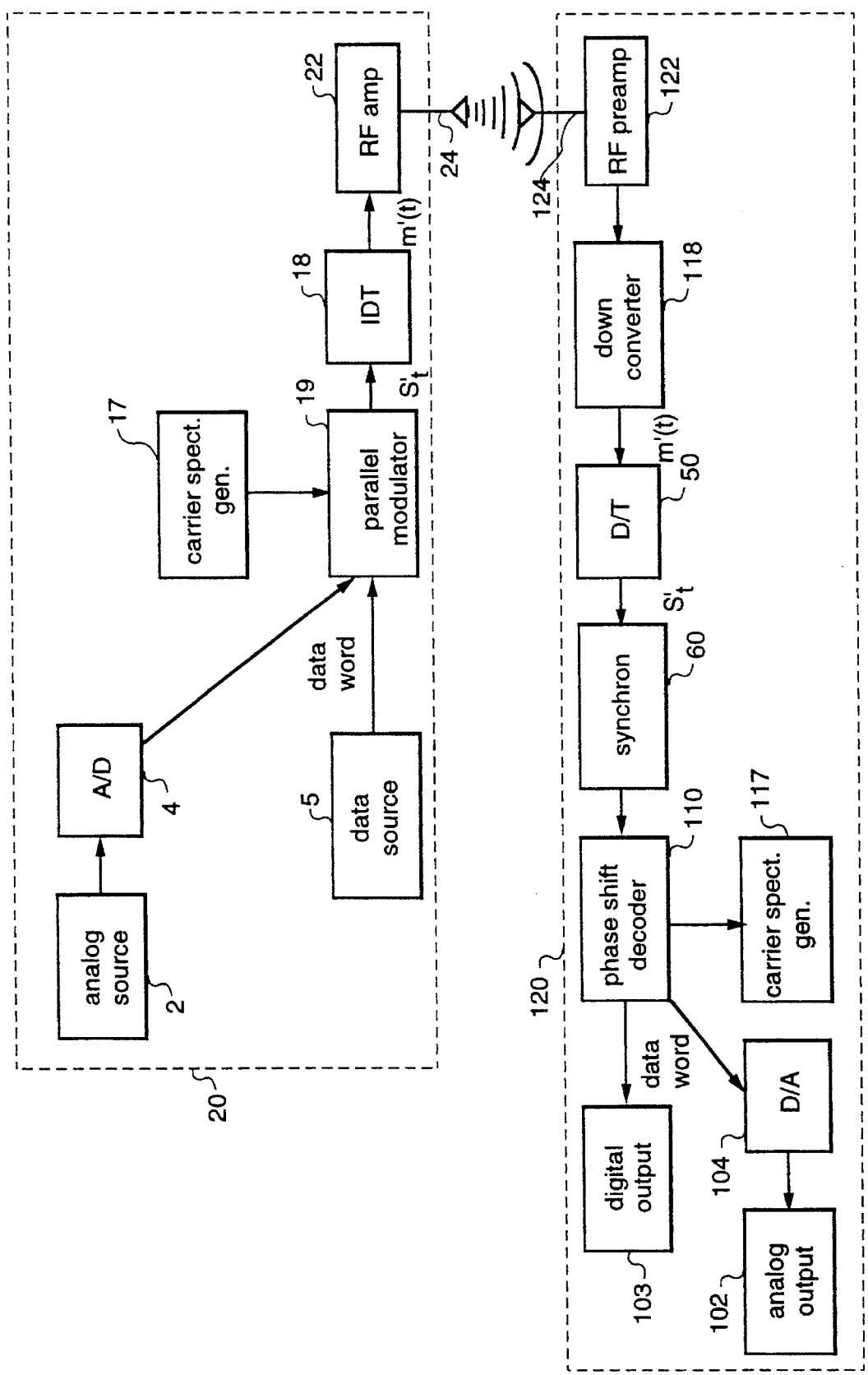
FIG. 1 is a simplified block diagram of a digital radio communication system according to the present invention.

FIG. 1 is a block diagram of a presently preferred embodiment of the present invention showing a transmitter 20 and a receiver 120. Digital information, in the form of parallel data words, desired to be transmitted is provided by a data source 5. The digital information may also be provided by an analog source 2 that is sampled by an analog to digital (A/D) converter 4, as shown in phantom.

A carrier spectrum generator 17 synthesizes a complex spectrum comprised of amplitudes and phases for a carrier signal to be employed in transmitting the data words.

Figure 2:
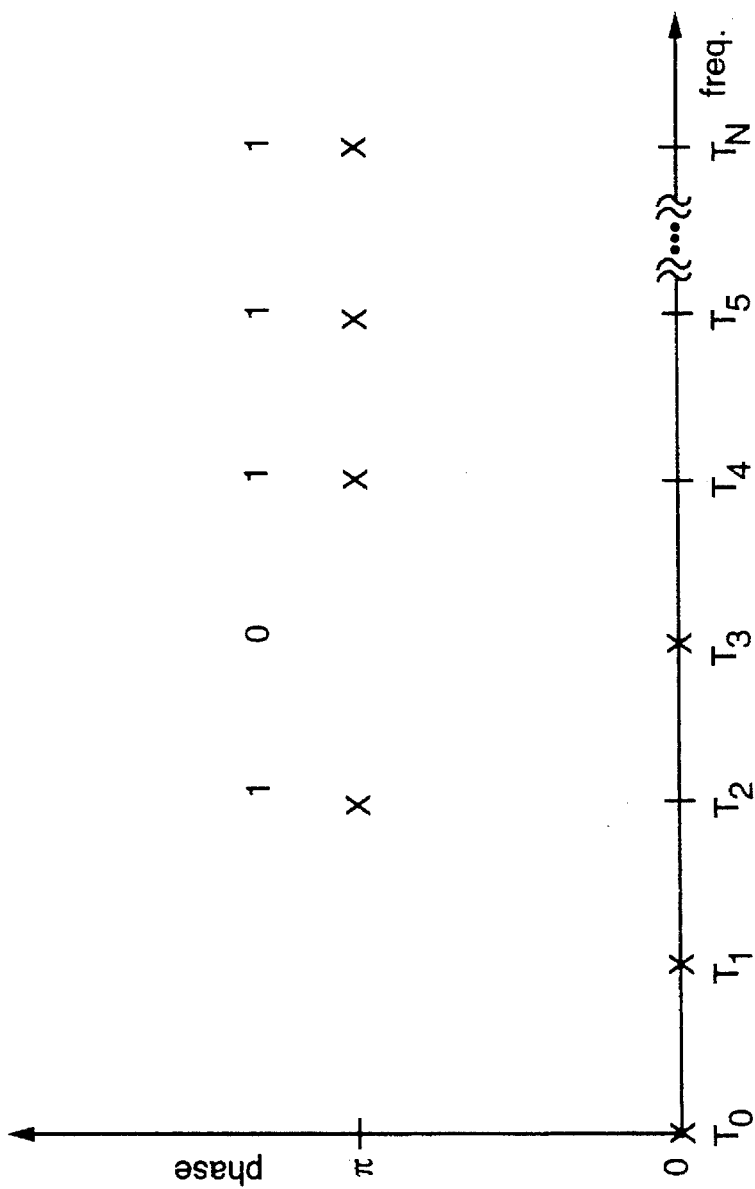
FIG. 2 is a frequency vs. phase diagram illustrating a data word modulation scheme according to the present invention.

A parallel modulator 19 coupled to the carrier spectrum generator receives the carrier signal spectrum and sections it into frequency bands defined as "tones". The tones are numbered from a zeroeth frequency, $T_0$, to a last tone $T_N$, as shown in FIG. 2. It is envisioned that there will be $2^M$ tones where M is 5 or 6. In the complex frequency domain, each tone is represented by an amplitude and a phase.

The data words desired to be transmitted are provided to parallel modulator and used to alter the phase of tones $T_1$ through $T_N$ according to a predetermined modulation convention. In the example of FIG. 2, a '0' is modulated as a zero phase shift of a tone and a '1' is a $\pi$ phase shift of a tone. $T_0$ is the DC term and is not used. $T_1$ is set to zero phase shift to allow synchronization of the radio signal. The first four bits of the data word being transmitted, $T_2$, $T_3$, $T_4$, $T_5$, in FIG. 2 are '1011' with the last bit, $T_N$ being '1'.

In FIG. 1, the entire set of tones for a data word of time period 't' is spectrum $S_t$. Spectrum $S_t$ is converted to a time-varying radio message signal m(t) by an inverse discrete transform (IDT) unit 18. The inverse discrete transform may be an inverse Fourier, inverse Hadamard, or inverse Discrete Cosine as transform.

Message signal m(t) is passed to a radio frequency (RF) amplifier 22 which creates an RF signal transmitted through antenna 24 which is received by antenna 124 of receiver 120.

The transmitted signal is sensed by a receiving antenna 124, passed to an RF preamplifier 122 and heterodyned by a down converter 118 to provide an intermediate frequency (IF) signal, m'(t) which is the equivalent of the message signal m(t).

A discrete transform unit 50, performs a transform which is the inverse of the operation executed by IDT unit 18, and transforms the message signal m'(t) into a spectrum $S'_t$ comprised of tones $T'_2$, $T'_3$, $T'_4$, $T'_5$, ... $T'_N$, which correspond to tones of the employed in parallel modulator 19 in transmitter 20.

Synchronization unit 60 monitors the $S'_t$ signal to determine regularly spaced '0' phase shifts in tone $T'_1$. This provides the synchronizing required to distinguish a spectrum, $S'_{t1}$, of a data word from time $t_1$ from a spectrum $S'_{t2}$ from time $t_2$. Synchronizer separates these spectra and provides them to phase shift decoder 110.

A carrier spectrum generator 117 synthesizes a complex spectrum for a carrier signal to be employed in transmitting the data words comprised of amplitudes and phases, the same as the carrier spectrum generator in transmitter 20.

Phase shift decoder 110 determines phase shifts for each tone, which may be determined by comparing the phase of each tone with a corresponding tone from carrier spectrum generator 117. Phase shift decoder 110 assembles a data word representing these phase shifts. An output device 103 then utilizes the decoded data words.

In an alternative embodiment, the output device may also be a digital to analog (D/A) converter 104 which converts the data words into an analog signal which is utilized by an analog output device 102.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of transmitting digital information over a radio frequency channel comprising the steps of:
    a) assembling data to be transmitted into data words each having N bits;
    b) transforming a carrier signal into a frequency spectrum in a frequency domain;
    c) separating the frequency spectrum of the carrier signal into a plurality of tones, one corresponding to a synchronization reference and the remainder each corresponding to a bit of a data word to be transmitted;
    d) shifting tones by a predetermined phase shift if the corresponding bit has a value of '$1^1$' for a first data word to be transmitted;
    e) inverse transforming the tones into a radio signal;
    f) transmitting a radio signal incorporating the phase shifts of the tones for the first data word at time t;
    g) repeating steps (d)–(f) for all data words to be transmitted;
    h) receiving the radio signal at a receiver;
    i) transforming the received radio signal into a received frequency spectrum;
    j) synchronizing the received radio signal so as to identify portions of the radio signal corresponding to different data words; and
    k) separating the received radio signal into data word intervals each corresponding to data word, and for each data word interval:
        1. separating the spectrum of the data word interval into data word tones,
        2. identifying the phase shift of each data word tone to identify bit values of the data word, and
        3. constructing the data word from the bit values.

2. The method of transmitting digital information of claim 1 wherein the step of identifying the phase shift of each tone comprises the steps of:
    a) synthesizing a frequency spectrum of the carrier signal;
    b) separating the carrier signal spectrum into carrier signal tones to correspond to the data word tones;
    c) comparing the phase of the carrier signal tones with the phase of the data word tones to result in a phase difference;
    d) assigning bit values to phase differences.

* * * * *